United States Patent [19]

Foltz

[11] Patent Number: 5,687,486
[45] Date of Patent: Nov. 18, 1997

[54] GRADE ROD

[75] Inventor: Dennis Eugene Foltz, Mt. Mourne, N.C.

[73] Assignee: Earnhardt Equipment Company, Huntersville, N.C.

[21] Appl. No.: 618,845

[22] Filed: Mar. 20, 1996

[51] Int. Cl.$^6$ .................................................. G01C 15/06
[52] U.S. Cl. ........................................ 33/296; 33/293
[58] Field of Search ........................... 33/293, 294, 295, 33/296, 809; 403/109

[56] References Cited

U.S. PATENT DOCUMENTS

| | | | |
|---|---|---|---|
| 2,642,667 | 6/1953 | Smiley | 33/809 |
| 3,374,545 | 3/1968 | Monroe | 33/293 |
| 4,060,909 | 12/1977 | Collins et al. | 33/296 |
| 4,221,483 | 9/1980 | Rando . | |
| 4,471,532 | 9/1984 | Francis | 33/296 |
| 5,070,620 | 12/1991 | Crain et al. | 33/296 |
| 5,457,890 | 10/1995 | Mooty | 33/293 |

FOREIGN PATENT DOCUMENTS 871520  3/1953  Germany ......................... 33/809

*Primary Examiner*—Thomas B. Will
*Attorney, Agent, or Firm*—Adams Law Firm, P.A.

[57] ABSTRACT

A grade rod is provided for measuring the depth of cut required to level a ground surface relative to a benchmark elevation location. The grade rod includes an elongated reference member having a reference mark for defining a predetermined elevation at the benchmark elevation location. An elongated extension member is slidably mounted adjacent to the reference member. The extension member has a base end for engaging the ground surface. The reference member is vertically movable relative to the extension member to permit vertical adjustment of the reference mark. A scale is carried by one of the reference member and the extension member for indicating to the user the vertical adjustment required to locate the reference mark at the predetermined elevation at any point on the ground surface. The measurement determines the depth of cut necessary for leveling the ground surface relative to the benchmark elevation location.

10 Claims, 3 Drawing Sheets

GRADE ROD

TECHNICAL FIELD AND BACKGROUND OF THE INVENTION

This invention relates to a grade rod for measuring the depth of cut required to level a ground surface, such as a parking lot. The invention is particularly applicable for use in combination with laser beam level instruments used in surveying. One such instrument is described in U.S. Pat. No. 4,221,483 issued to Spectra-Physics, Inc. of Mountain View, Calif. The complete disclosure of this patent is incorporated herein by reference.

A conventional laser beam level instrument is mounted on a tripod, and operates by projecting a rotating laser beam in a horizontal plane over an area to be surveyed. The laser beam is received by a small, portable electronic detector attached to an elongated rod carried upright by the surveyor. The detector is located at a precise distance above the base end of the rod corresponding to the vertical distance of the laser above the ground surface. The surveyor positions the rod at several different locations over the area to determine which locations require cut or fill in order to properly adjust the elevation.

When the detector is in horizontal alignment with the plane of the rotating laser beam it emits an audible beep indicating to the surveyor that the measured area is at the desired elevation. For low areas, the surveyor simply lifts the rod and adds filler material, such as dirt or gravel, to raise the elevation. The amount of filler is easily estimated, and the elevation retested by holding the rod upright in the direction of the laser. Filler material is gradually added until the detector reaches the elevation of the laser beam.

For high areas, the prior art method requires the surveyor to lean the rod forward in the direction of the laser until the detector beep sounds indicating a proper elevation. The amount of excavation required to lower the area to this elevation is estimated, and the desired elevation ultimately obtained by trial-and-error excavation. Since no measurements are taken, the survey crew is required to excavate the area on the spot while periodically testing the elevation using the rod and laser level instrument.

This common prior art technique is generally time consuming and labor intensive, particularly in areas where excavation is difficult. The present invention simplifies the process by providing a compressible grade rod with a graduated scale for indicating to the surveyor the precise amount of excavation required to level an area relative to a desired elevation. Moreover, measurements may be taken and recorded by the surveyor at several marked locations throughout the area, and subsequent excavation in the marked locations can be done without frequent testing using the laser level instrument.

SUMMARY OF THE INVENTION

Therefore, it is an object of the invention to provide a grade rod for use with a laser beam level instrument which reduces the amount of time and energy required to properly level an area.

It is another object of the invention to provide a grade rod which includes a graduated scale for indicating to the surveyor the precise amount of excavation required to level an area relative to a desired elevation.

It is another object of the invention to provide a grade rod wherein the graduated scale is located at a top end of the rod for being easily read by the surveyor while maintaining the rod in an upright position.

It is another object of the invention to provide a grade rod which is relatively inexpensive to manufacture.

These and other objects of the present invention are achieved in the preferred embodiments disclosed below by providing a grade rod for measuring the depth of cut required to level a ground surface relative to a benchmark elevation location. The grade rod includes an elongated reference member having a reference mark for defining a predetermined elevation at the benchmark elevation location. An elongated extension member is slidably mounted adjacent to the reference member. The extension member has a base end for engaging the ground surface.

The reference member is vertically movable relative to the extension member to permit vertical adjustment of the reference mark. Scale means are carried by one of the reference member or the extension member for indicating to the user the vertical adjustment required to locate the reference mark at the predetermined elevation at any point on the ground surface. The measurement determines the depth of cut necessary for leveling the ground surface relative to the benchmark elevation location.

According to one preferred embodiment of the invention, the reference member is a hollow, elongated outer member slidably receiving the extension member, and cooperating with the extension member to permit vertical adjustment of the reference mark.

According to another preferred embodiment of the invention, the hollow elongated outer member is formed of first and second joined outer segments.

According to yet another preferred embodiment of the invention, the scale means is a measuring rod marked off in units. The rod is extendable outwardly from a top end of the hollow outer member for indicating to the user the vertical adjustment required to locate the reference mark at the predetermined elevation.

According to yet another preferred embodiment of the invention, biasing means are connected to the reference member and the extension member for normally maintaining the reference mark at a preset, spaced distance from the base end of the extension member.

According to yet another preferred embodiment of the invention, the biasing means is an elongated coil spring.

According to yet another preferred embodiment of the invention, the reference mark is a removably attachable electronic detector for detecting a horizontally projected light beam.

According to yet another preferred embodiment of the invention, the reference member and the extension member are constructed of wood.

According to another preferred embodiment, a grade rod includes a hollow, elongated outer member having a reference mark defining a predetermined elevation at the benchmark elevation location. An elongated inner member is slidably received within the outer member, and has a base end for engaging the ground surface. The outer member and the inner member cooperate to permit vertical adjustment of the reference mark. Scale means are carried by the inner member for indicating to the user the vertical adjustment required to locate the reference mark at the predetermined elevation at any point on the ground surface. The measurement determines the depth of cut necessary for leveling the ground surface relative to the benchmark elevation location.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
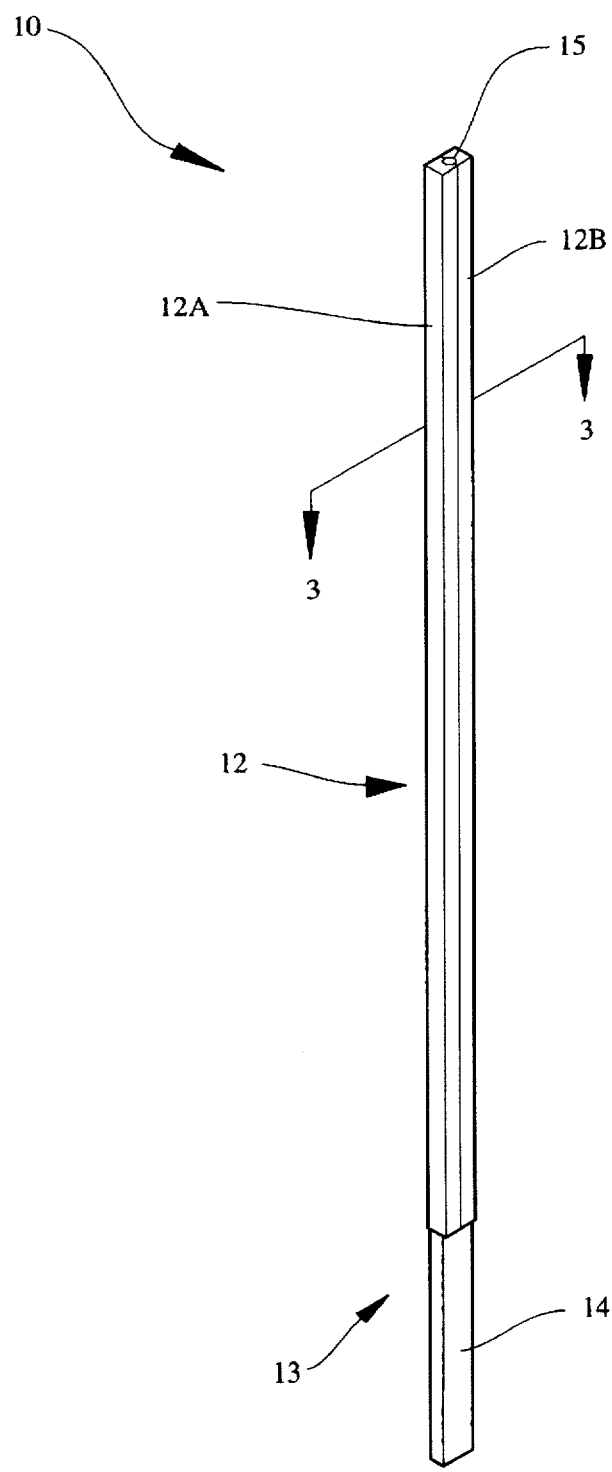
FIG. 1 is a perspective view of the grade rod according to one preferred embodiment of the invention.

Referring now specifically to the drawings, a grade rod according to the present invention is illustrated in FIG. 1 and shown generally at reference numeral 10. The grade rod 10 is particularly useful in combination with a standard laser beam level instrument 11 (See FIGS. 4 and 5), such as disclosed in U.S. Pat. No. 4,221,483. The grade rod 10 is used primarily for fine grading of pre-cleared, relatively flat areas having 1.0 foot or less grade variation. Operation of the grade rod 10 and level instrument 11 are described further below with reference to FIGS. 4 and 5.

Figure 2:
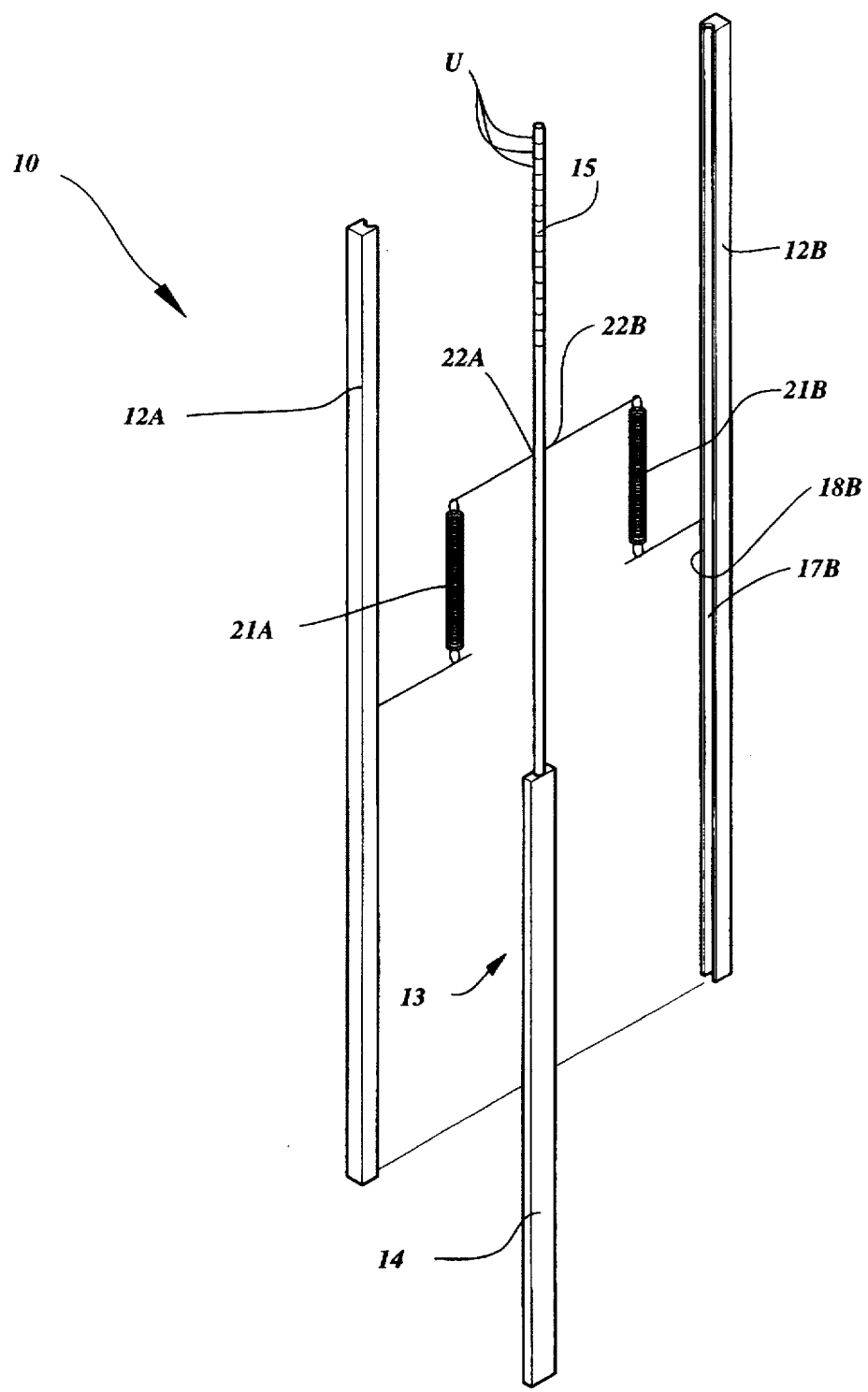
FIG. 2 is an exploded view of grade rod illustrating its interior components.
Figure 3:
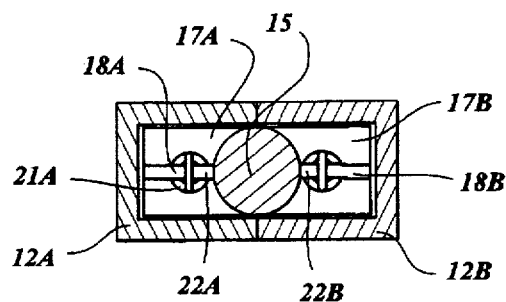
FIG. 3 is a cross-sectional view of the grade rod taken substantially along line 3—3 of FIG. 1 at a point slightly above the top end of the springs.

Referring to FIGS. 1–3, the grade rod 10 includes an elongated reference member 12 formed of first and second outer segments 12A and 12B. The segments 12A and 12B include respective hollowed channels extending longitudinally the entire length of the segments, and collectively defining a hollow center when the segments 12A and 12B are joined. The segments 12A and 12B are attached together using any suitable fastener, adhesive, or tape. An elongated inner extension member 13 is slidably received within the hollow center of the reference member 12, and includes a base 14 for engaging the ground and a scale rod 15 attached to a top end of the base 14. The scale rod 15 is marked off in units "U", and is exposed outwardly from a top end of the outer reference member 12 by sliding the outer reference member 12 downwardly over the inner extension member 13. The exposed portion of the scale rod 15 is located a spaced-apart distance above the ground for convenient reading by a user.

As shown in FIGS. 2 and 3, the outer segments 12A and 12B of reference member 12 include respective inside shoulders 17A and 17B with attached anchors 18A and 18B. The anchors 18A, 18B hold respective bottom ends of elongated coil springs 21A and 21B. The opposite ends of the springs 21A, 21B are attached to outward extending pegs 22A and 22B connected to the scale rod 15. The springs 21A, 21B function to normally maintain the scale rod 15 entirely within the outer reference member 12 with a top end of the rod 15 flush with the top end of the reference member 12, as shown in FIG. 1. As the reference member 12 is urged downwardly by the user along the length of the inner extension member 13, the springs 21A, 21B extend and the scale rod 15 is exposed for reading. When the downward force is released by the user, the springs 21A, 21B return the outer reference member 12 to its original position covering the scale rod 15.

OPERATION OF THE GRADE ROD 10 AND LASER BEAM LEVEL INSTRUMENT 11

Figure 4:
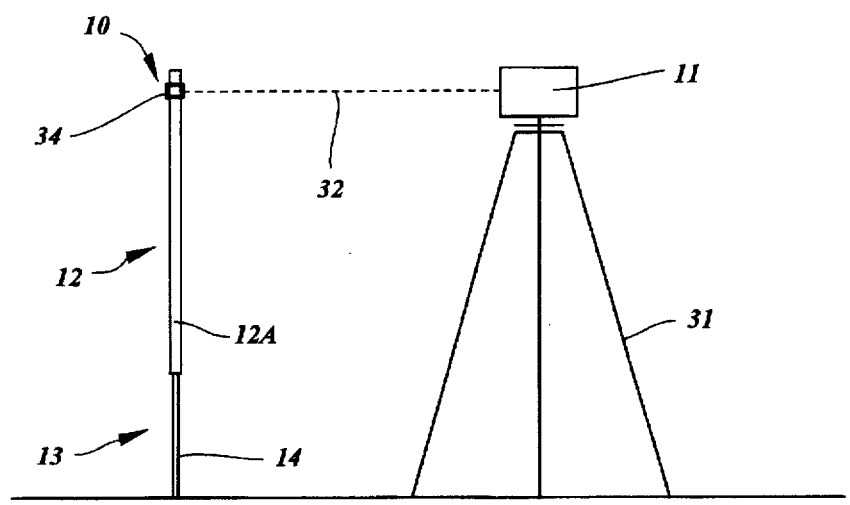
FIG. 4 is an environmental view of the grade rod and level instrument.
Figure 5:
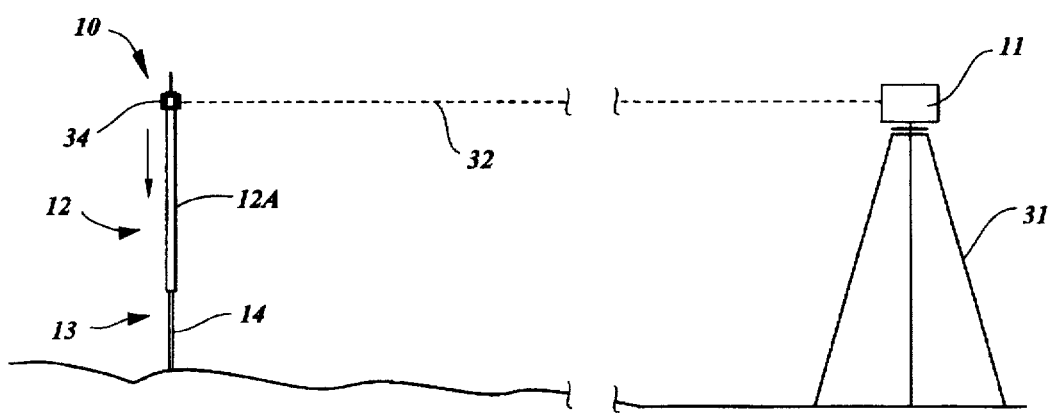
FIG. 5 is a second environmental view of the grade rod and level instrument, and showing the grade rod positioned at a high elevation area with the scale rod exposed for convenient reading by user.

Referring to FIGS. 4 and 5, the level instrument 11 is mounted on a tripod 31 at a benchmark location, and operates by projecting a rotating laser beam 32 in a horizontal plane over an area to be graded. The term "benchmark location" is used herein to refer to a reference point of known elevation, or point from which relative elevations about an area may be determined. The laser beam 32 is received by a small electronic detector 34 removably attached to the outer reference member 12 of the grade rod 10 at a precise distance above the base end of the inner extension member 13. When the electronic detector 34 and laser beam 32 are in horizontal alignment, the detector 34 emits an audible beep to indicate this condition to the user.

As shown in FIG. 4, to begin leveling an area, the grade rod 10 is first held upright near the level instrument 11 at the benchmark location, and the electronic detector 34 secured to the outer reference member 12 at a point in signal-receiving alignment with the rotating laser beam 32. The grade rod 10 is then moved by the user to several different locations throughout the area, and the elevation tested by facing the detector in the direction of the laser beam 32.

As shown in FIG. 5, for high elevation areas, the outer reference member 12 is urged downwardly against the force of the springs 21A, 21B, as previously described, to a point where the electronic detector 34 intercepts the laser beam 32. This exposes a portion the scale rod 15. When the detector beep sounds, the user reads the scale rod 15 indicating the distance the rod 15 extends above the top end of the reference member 12. This distance corresponds to the depth of cut required to level the measured location. Excavation can be done immediately, or the location suitably marked for later excavation. Low elevation areas are easily filled with earth and/or gravel in a conventional manner.

The grade rod may be constructed of any suitable material such as wood, plastic, aluminum, fiberglass, or the like. The outer reference member may be a single, integrally-formed hollow structure. In addition, the reference member and extension member may be slidably attached together by other alternative means which allow compression and extension of the grade rod.

A grade rod is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. A grade rod for measuring the depth of cut required to level a ground surface relative to a benchmark elevation location, said grade rod comprising:

(a) an elongated reference member having a reference mark for defining a predetermined elevation at the benchmark elevation location;

(b) an elongated extension member slidably mounted adjacent to said reference member, and having a base end thereof for engaging the ground surface;

(c) said reference member being vertically movable relative to said extension member along a longitudinal axis thereof to permit vertical adjustment of the reference mark;

(d) an elongated coil spring connected to said reference member and said extension member and extending parallel to the longitudinal axis of said extension member for normally maintaining the reference mark a preset spaced distance from the base end of said extension member such that upon sliding vertical movement of said reference member relative to said extension member, said coil spring creates a biasing force urging the return of said reference mark to its original spaced distance from the base end of said extension member; and (e) scale means carried by one of said reference member and said extension member for indicating to the user the vertical adjustment required to locate the reference mark at said predetermined elevation at any point on the ground surface to thereby determine the depth of cut necessary for leveling the ground surface relative to the benchmark elevation location.

2. A grade rod according to claim 1, wherein said reference member comprises a hollow, elongated outer member slidably receiving said extension member therein, and cooperating with said extension member to permit vertical adjustment of said reference mark.

3. A grade rod according to claim 2, wherein said hollow, elongated outer member is formed of first and second outer sections defining a hollow center area when joined.

4. A grade rod according to claim 2, wherein said scale means comprises a measuring rod marked off in units, and extendable outwardly from a top end of said hollow outer member for indicating to the user the vertical adjustment required to locate the reference mark at said predetermined elevation.

5. A grade rod according to claim 1, wherein said reference mark comprises a removably attachable electronic detector for detecting a horizontally projected light beam.

6. A grade rod according to claim 1, wherein said reference member and said extension member are constructed of wood.

7. A grade rod for measuring the depth of cut required to level a ground surface relative to a benchmark elevation location, said grade rod comprising:

(a) a hollow, elongated outer member having a reference mark defining a predetermined elevation at the benchmark elevation location;

(b) an elongated inner member slidably received within said outer member, and having a base end thereof for engaging the ground surface, said outer member and said inner member cooperating to permit vertical adjustment of the reference mark;

(c) an elongated coil spring connected to said outer member and said inner member and extending parallel to a longitudinal axis of said inner member for normally maintaining the reference mark a preset spaced distance from the base end of said inner member such that upon sliding vertical movement of said outer member relative to said inner member, said coil spring creates a biasing force urging the return of said reference mark to its original spaced distance from the base end of said inner member; and (d) scale means carried by said inner member for indicating to the user the vertical adjustment required to locate the reference mark at said predetermined elevation at any point on the ground surface to thereby determine the depth of cut necessary for leveling the ground surface relative to the benchmark elevation location.

8. A grade rod according to claims 7, wherein said scale means comprises a measuring rod marked off in units, and extendable outwardly from a top end of said hollow outer member for indicating to the user the vertical adjustment required to locate the reference mark at said predetermined elevation.

9. A grade rod according to claim 7, wherein said reference mark comprises a removably attachable electronic detector for detecting a horizontally projected light beam.

10. A grade rod according to claim 7, wherein said reference member and said extension member are constructed of wood.

* * * * *